United States Patent
Ide

(10) Patent No.: US 11,454,806 B2
(45) Date of Patent: Sep. 27, 2022

(54) MONITORING CAMERA HAVING A HEATER

(71) Applicant: Axis AB, Lund (SE)

(72) Inventor: Hiroyuki Ide, Tokyo (JP)

(73) Assignee: AXIS AB, Lund (SE)

( * ) Notice: Subject to any disclaimer, the term of this patent is extended or adjusted under 35 U.S.C. 154(b) by 138 days.

(21) Appl. No.: 17/107,085

(22) Filed: Nov. 30, 2020

(65) Prior Publication Data

US 2021/0255457 A1 Aug. 19, 2021

(30) Foreign Application Priority Data

Feb. 18, 2020 (EP) .................................. 20157901

(51) Int. Cl.
*G03B 17/55* (2021.01)
*G02B 27/00* (2006.01)

(52) U.S. Cl.
CPC ......... *G02B 27/0006* (2013.01); *G03B 17/55* (2013.01)

(58) Field of Classification Search
CPC ...... G02B 27/0006; G02B 2006/12135; G03B 17/55; G03B 17/00; G03B 17/08; G03B 17/56; G03B 19/00; G03B 2217/00; G03B 2219/00; G03B 21/16; H04N 5/2252; H04N 5/22521; H04N 5/2251
USPC ....................................................... 359/512
See application file for complete search history.

(56) References Cited

U.S. PATENT DOCUMENTS

| 5,332,031 A * | 7/1994 | Kiga ..................... H04N 5/2253 348/E5.026 |
| 9,618,828 B2 | 4/2017 | Lang et al. |
| 2011/0298925 A1* | 12/2011 | Inoue .................. H04N 5/2254 348/148 |
| 2012/0170119 A1 | 7/2012 | Chu et al. |

(Continued)

FOREIGN PATENT DOCUMENTS

| CN | 109828425 A | 5/2019 |
| EP | 3349063 A1 | 7/2018 |

(Continued)

OTHER PUBLICATIONS

Extended European Search Report dated Jul. 24, 2020 for the European Patent Application No. 20157901.8.

*Primary Examiner* — Stephone B Allen
*Assistant Examiner* — Rahman Abdur
(74) *Attorney, Agent, or Firm* — Volpe Koenig

(57) ABSTRACT

A camera having a heating arrangement comprising a heater arranged to supply heat to a window. A thermally conductive member is arranged in contact with a housing and with the heating arrangement, when a temperature at the conductive member is below a threshold, to transfer heat supplied by the heater to the housing. A thermally insulating member is arranged in proximity with the housing and the heating arrangement. The conductive and/or insulating member is configured to, when the temperature increases above the threshold during heater operation, change its extension to enable contact between the insulating member and the housing and between the insulating member and the heating arrangement, and to disable contact between the conductive member and the housing and between the conductive member and the heating arrangement, thereby thermally insulate the housing from the heater.

15 Claims, 4 Drawing Sheets

(56) References Cited

U.S. PATENT DOCUMENTS

| | | | |
|---|---|---|---|
| 2013/0070102 A1* | 3/2013 | Gustafson | G01J 5/05 348/E5.09 |
| 2015/0160536 A1* | 6/2015 | Lang | H04N 5/2254 348/374 |
| 2016/0024227 A1 | 1/2016 | Kaldstrom et al. | |
| 2016/0242271 A1 | 8/2016 | Akimoto | |
| 2017/0302830 A1* | 10/2017 | Akimoto | H01M 10/613 |
| 2019/0289181 A1 | 9/2019 | Uetsuji et al. | |

FOREIGN PATENT DOCUMENTS

| | | |
|---|---|---|
| EP | 3709079 A1 | 9/2020 |
| KR | 20180059063 A | 6/2018 |
| WO | 2018/196190 A1 | 11/2018 |
| WO | 2019/179545 A1 | 9/2019 |

\* cited by examiner

MONITORING CAMERA HAVING A HEATER

TECHNICAL FIELD

Embodiments disclosed herein relate to the field of monitoring cameras. Especially, embodiments herein relate to a monitoring camera comprising a heater configured to heat both a window and a housing of the monitoring camera.

BACKGROUND

Monitoring cameras are increasingly popular for commercial as well as personal installations. In the most straightforward application, the purpose of the monitoring camera is to identify events taking place within the scene it images, so as to allow for an algorithm or an operator to deduce if something out of the ordinary occurs. The deduction may be performed in real time in a live stream from the monitoring camera, or the deduction could be based on recorded material. Another application may be to have monitoring cameras arranged on and in a vehicle, such as a vehicle for public transportation. In such an application the monitoring cameras may be used to help operators to understand the situation in and around the vehicle, and in the unlucky event that an accident or other unwanted event would happen, recorded video material may be used to clarify the circumstances.

Regardless of the application, a prerequisite for the usability of the material acquired by a monitoring camera is that the camera view is not obstructed, and for cameras arranged in an outdoor environment this is an issue to account for. Airborne pollutions such as dust may gradually obstruct the view over time but given normal circumstances the effect of these causes may be handled by means of ensuring adequate service intervals. Vandalism, such as if an individual spray paints the camera results in a rapid deterioration of the view, and in the event of such an activity the camera system may alert an operator so that the issue can be mended. Vandalism may be difficult to account for, yet monitoring cameras, or housings accommodating monitoring cameras may have a constructional protection to withstand at least some amount of vandalism in the form of impacts. A more frequently recurring reason for obstruction is weather. In cold temperatures snow and ice can generate rapid buildup of material that blocks the view of the monitoring camera. A monitoring camera having an impact resistant window assembly for an outdoor housing of a camera is disclosed in applicant's own application EP 19162804.9 (not yet published). However, the ambient temperature surrounding the monitoring camera may also influence the operation of the monitoring camera's electronical components. For example, some of the electronical components may not operate at all or at least operate suboptimally when the ambient temperature is too high or too low.

Embodiments disclosed herein aim at providing an improved monitoring camera comprising a heater, which heater may be used during operations of the camera in cold environments.

SUMMARY

In view of that stated above, providing a monitoring camera mitigating at least some of the problems disclosed above would be beneficial. Additionally, providing a monitoring camera with improved functionality at low temperatures, e.g. at low ambient temperatures would also be beneficial.

To achieve at least one of the above benefits that will be evident from the following description, a monitoring camera is provided. Preferred embodiments will be evident from the description.

According to a first aspect, there is provided a monitoring camera having a heating arrangement comprising a heater arranged to supply heat to a camera window.

The monitoring camera comprises a thermally conductive member having a first contacting surface and a second contacting surface. The first contacting surface is arranged in contact with a housing of the camera and the second contacting surface is arranged in contact with a contacting surface of the heating arrangement when a local temperature at the thermally conductive member is below a local temperature threshold, thereby arranged to transfer heat supplied by the heating arrangement to the housing.

Further, the monitoring camera comprises a thermally insulating member having a first contacting surface arranged in close proximity with the housing and a second contacting surface arranged in close proximity with the contacting surface of the heating arrangement.

At least one out of the thermally conductive member and the thermally insulating member is configured to, when the local temperature at the thermally conductive member and the thermally insulating member increases above the local temperature threshold during operation of the heater, change its extension in a direction perpendicular to the contacting surface of the heating arrangement to:

enable contact between the first contacting surface of the thermally insulating member and the housing and between the second contacting surface of the thermally insulating member and the contacting surface of the heating arrangement, and disable contact between the first contacting surface of the thermally conductive member and the housing and between the second contacting surface of the thermally conductive member and the contacting surface of the heating arrangement, thereby arranged to thermally insulate the housing from the heating arrangement.

By the above arrangement of the monitoring camera, the heater will always supply heat to the camera window when the heater is in operation. The heating of the camera window will melt possible snow and ice buildup generated in cold weather and the field of view of the monitoring camera will be improved.

When the heater is started it will also heat the housing thanks to the thermally conductive member being in contact with both the housing and with the heating arrangement. The local temperature at the thermally conductive member will determine for how long period of time the housing will be heated, but it will be heated as long as the heater is on and as long as the local temperature is below a local temperature threshold.

An advantage with the above arrangement of the monitoring camera is that depending on the local temperature at the thermally conductive member, the heater will only heat the camera window, or it will heat the camera window and the camera housing in combination.

An additional advantage with the above arrangement is that, when the local temperature at the thermally conductive member has reached and passed the local temperature threshold, at least one of the thermally conductive member and the thermally insulating member will change its extension in the direction towards the heating arrangement such that the thermal contact between the thermally conductive member and the heating arrangement is disabled and an insulating contact between the thermally insulating member and the heating arrangement is enabled. Thereby, the housing is insulated from the heating arrangement and heat is only supplied to the camera window.

For example, the heater may be started at an ambient temperature at or below zero degrees Celsius, and the heating of the housing may continue until the local temperature at the thermally conductive member is about 20 degrees Celsius, when at least one of the thermally conductive member and the thermally insulating member will change its extension in the direction towards the heating arrangement such that the thermal contact between the thermally conductive member and the heating arrangement is disabled and the insulating contact between the thermally insulating member and the heating arrangement is enabled.

In some embodiments, the thermally conductive member is a hollow frame, and the thermally insulating member is configured as one or more thermally insulating elements attached to one or more inner surfaces and/or to one or more outer surfaces of the hollow thermally conductive member.

By the expression "hollow frame" when used in the disclosure should be understood as a plate, sheet or disc having and outer circumferential part surrounding an inner opening. The outer circumferential part is sometimes referred to as an edging. Thus, the hollow frame may comprise an edging surrounding the inner opening. The inner opening may be a central opening. The hollow frame may have a rectangular, circular or oval shape, as may the inner opening.

Alternatively, and in some embodiments, the thermally insulating member is a hollow frame, and the thermally conductive member is configured as one or more thermally conducting elements attached to one or more inner surfaces and/or to one or more outer surfaces of the hollow thermally insulating member.

In some embodiments disclosed herein, one of the thermally conductive member and the thermally insulating member is an outer hollow frame and the other one of the thermally conductive member and the thermally insulating member is an inner hollow frame attached within the outer hollow frame.

A thickness of the thermally conductive member may be the same or almost the same as a thickness of the thermally insulating member at the local threshold temperature. The thicknesses may be taken in the direction perpendicular to the contacting surface of the heating arrangement.

In some embodiments, the local threshold temperature is in the range of 10 to 30 degrees Celsius. For example, the local threshold temperature may be 20 degrees Celsius.

The thermally conductive member may be made from aluminum. Further, the thermally insulating member may be made from plastic.

In one or more embodiments, the heating arrangement may comprise a thermally conductive holder configured to hold the heater between an outer heater holding plate and an inner heater holding plate and configured to hold the heater in thermal contact with the camera window to supply heat to peripheral parts thereof during operation of the heater.

In such embodiments, a biased elastic member may be arranged between the inner heater holding plate and a fixation plate fixedly arranged to an inner surface of the housing. The biased elastic member is configured to urge the heater towards the camera window by pressing the inner heater holding plate towards the camera window.

The monitoring camera may comprise a central processing unit (CPU) arranged on a printed circuit board (PCB) thermally connected to the housing. Further, the CPU may be configured to be heated when the housing is thermally connected to and heated by the heater. Since, the PCB is thermally connected to the housing and since the CPU is arranged on the PCB, the CPU will be heated when the housing is heated. This is advantageous at low ambient temperatures at which the CPU needs to be heated to a local temperature above a CPU operation temperature threshold in order to be capable of being switched on.

In some embodiments, the CPU may be capable of being switched on for operation when its temperature is above a lower CPU operation temperature threshold. The lower CPU operation temperature threshold may be in the range of −40 to −20 degrees Celsius. For example, the lower CPU operation threshold temperature may be −30 degrees Celsius. Thus, at very low ambient temperatures, e.g. below −40 degrees Celsius, the CPU needs to be heated to a local temperature above −30 degrees Celsius before the CPU is capable of being switched on.

In some embodiments, the camera window is a compound window comprising an inner window configured as a transparent plate arranged closest to a camera lens, and an outer window configured as a protective window and arranged in a plane parallel to the inner window, on an outside thereof, and in close proximity with the inner window.

Alternatively, and in some embodiments, the heating arrangement comprises an inner window configured as a transparent plate. In such embodiments, the camera window is an outer window configured as a protective window and arranged in a plane parallel to the inner window, on an outside thereof, and in close proximity with the inner window.

The inner window may be made of a transparent material, such as glass. The outer window may be made of a transparent material, such as polycarbonate.

BRIEF DESCRIPTION OF THE DRAWINGS

Embodiments will now be described in more detail by way of example and with reference to the accompanying schematic drawings, where the same reference numerals will be used for similar elements, wherein.

DETAILED DESCRIPTION OF EMBODIMENTS

Embodiments will now be described more fully hereinafter with reference to the accompanying drawings. It should be understood that the detailed description and specific examples, while indicating preferred embodiments, are given by way of illustration only, since various changes and modifications within the scope will become apparent to those skilled in the art from this detailed description.

Hence, it is to be understood that the embodiments are not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

Figure 1:
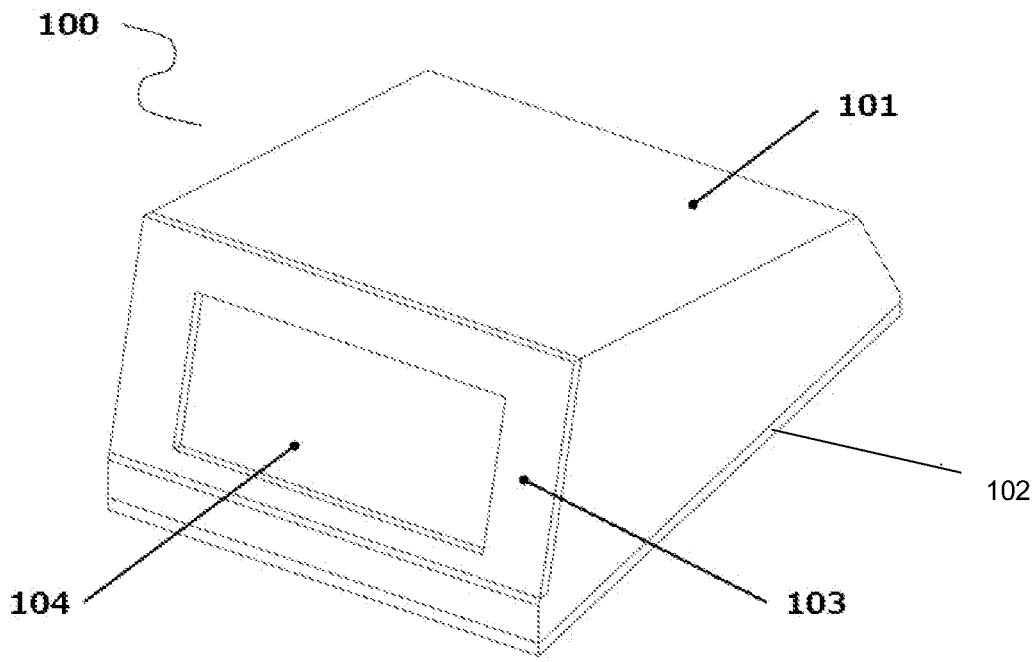
FIG. 1 is a perspective view of a monitoring camera according to some embodiments.

FIG. 1 is a perspective view of a monitoring camera 100 according to some embodiments. The monitoring camera 100 may have a box-shaped form as illustrated in FIG. 1, but it should be understood that the mentoring camera may have any other suitable shape for outdoor monitoring applications. As illustrated in FIG. 1, the monitoring camera 100 comprises a cover top 101, a cover bottom 102, and a cover front 103. The cover top 101, cover bottom 102 and the cover front 103 are sometimes referred to as an outer cover, a camera housing or to just a cover or a housing 101, 102, 103. The cover top 101, the cover bottom 102 and the cover front 103 may be made of a thermally conductive material, such as aluminum, and they may be thermally connected to each other to form the housing. For example, the cover top 101, the cover bottom 102 and the cover front 103 may be made out of an aluminum die cast. The monitoring camera 100 further comprises a camera window 104,111 at the housing. The camera window 104,111 may comprise an outer window 104 arranged, e.g. replaceably arranged, at the housing and forming a transparent part thereof. For example, the outer window 104 may be arranged between the cover top 101 and the cover front 103. The outer window 104 may be made as a plate or a disc from a transparent material, such as a resilient transparent material, e.g., polycarbonate. Thanks to the resilience of the material, the outer window 104 may function as a protective window able to resist an external impact. In some embodiments, the camera window 104,111 is a compound window and it may in addition to the outer window 104 also comprise an inner window 111, cf. FIG. 2 which will be described below. In some embodiments, the inner window 111 is made as a plate, a sheet or a disc from a transparent material, such as glass. Reference may here be made to applicant's pending application EP 19162804.9 (not yet published) for details of possible embodiments.

It should be understood that the plate or the sheet may be a rectangular plate or sheet, and that the disc may be a circular disc or an oval disc Some embodiments of the monitoring camera 100 will now be described in more detail with reference to FIGS. 2-4. The monitoring camera 100 has a heating arrangement 111, 112, 113, 114, 115 comprising a heater 112 arranged to supply heat to the camera window 104, 111. Further, the heating arrangement 111, 112, 113, 114, 115 of the monitoring camera 100 may be configured to supply heat to the housing 101, 102, 103 in addition to supplying heat to the camera window 104, 111. In the description below, it will be described how the housing 101, 102, 103 is heated by supplying heat from the heating arrangement 111, 112, 113, 114, 115 to the cover top 101. It should be understood that this is only given as an example and that the housing 101, 102, 103, alternatively or additionally, may be heated by supplying heat from the heating arrangement 111, 112, 113, 114, 115 to the cover bottom 102 and/or to the cover front 103. Thus, this disclosure should not be limited to embodiments, wherein the housing 101, 102, 103 is heated by supplying heat to the cover top 101. Instead, the description is also applicable to embodiments, wherein the housing 101, 102, 103 is heated by supplying heat to the cover bottom 102 or to the cover front 103.

Figure 2:
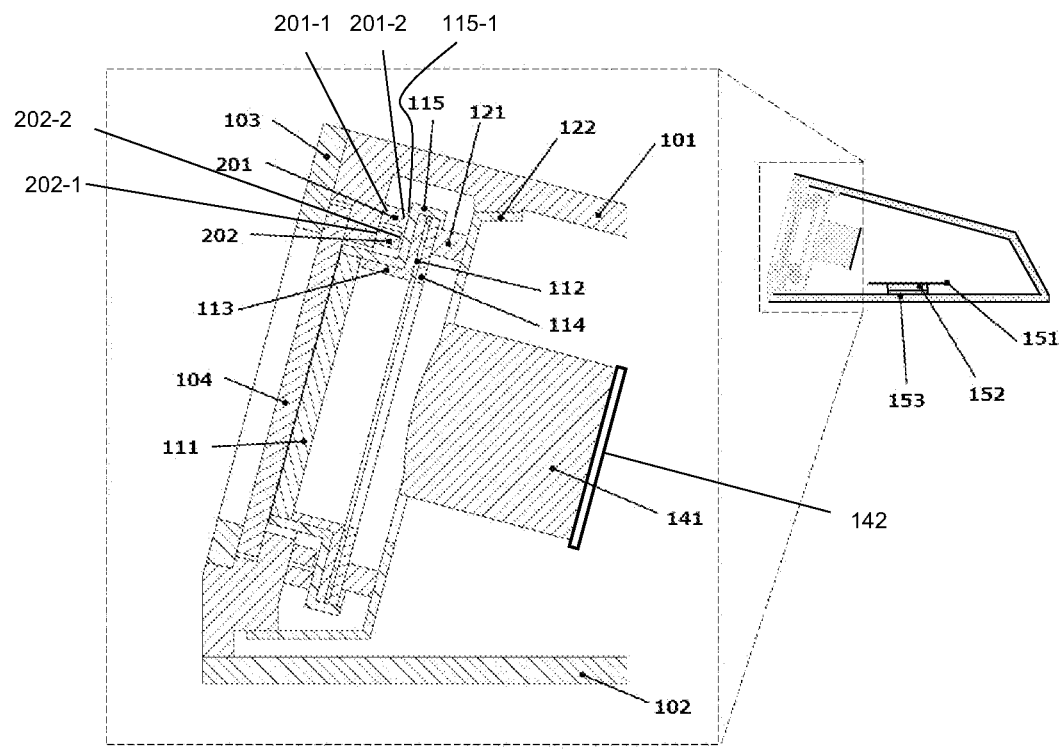
FIG. 2 is a sectional side view of a monitoring camera and of an enlarged front part thereof according to some embodiments wherein a housing is in thermal contact with the heating arrangement.

FIG. 2 is a sectional side view of the monitoring camera 100 and of an enlarged front part thereof according to some embodiments wherein the housing 101,102,103, e.g. the cover top 101, is in thermal contact with a heating arrangement 111, 112, 113, 114, 115. The housing 101,102,103 being in thermal contact with the heating arrangement may be referred to as a starting position or a housing heating position. As will be described in more detail below, when the heating arrangement 111, 112, 113, 114, 115 starts to supply heat at an ambient temperature at or below for example zero degrees Celsius, the supplied heat will be conducted from the heat arrangement to the cover top 101. Thereby, the heating arrangement 111, 112, 113, 114, 115 will heat both the camera window 104, 111 and the cover top 101. The cover top 101 is thermally connected to the other cover parts and thus the entire housing 101, 102, 103 will be heated when heat is conducted from the heating arrangement 111, 112, 113, 114, 115 to the cover top 101.

Figure 3:
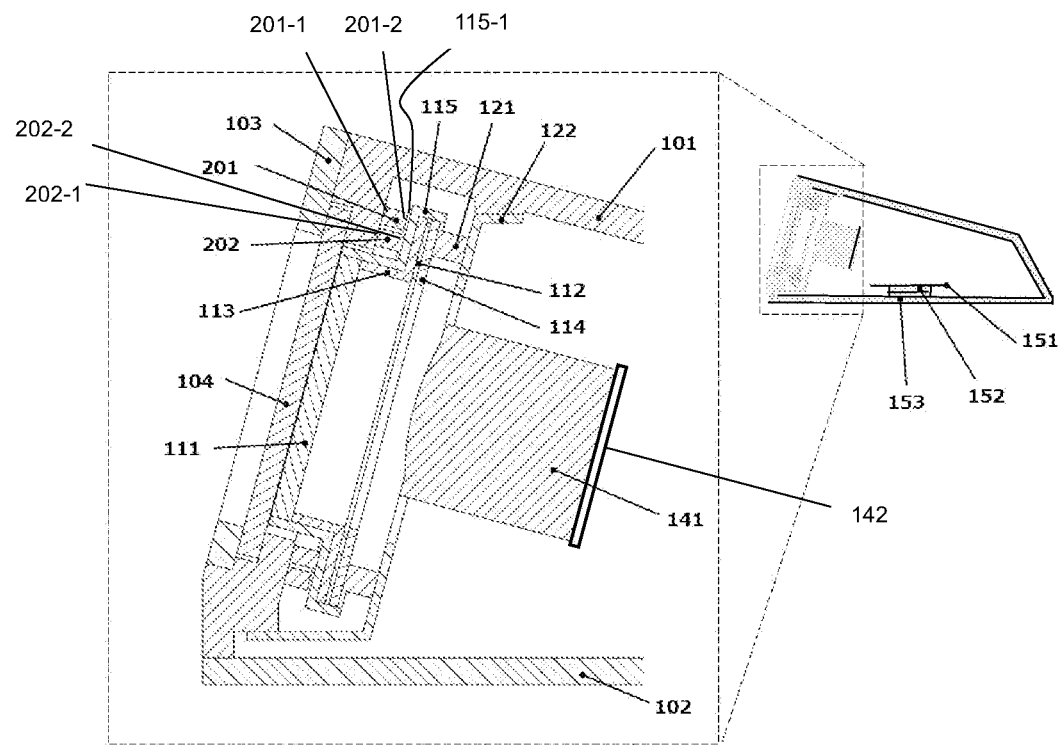
FIG. 3 is a sectional side view of a monitoring camera and of an enlarged front part thereof according to some embodiments wherein the housing is insulated from the heating arrangement.

FIG. 3 is a sectional view of the monitoring camera 100 and of an enlarged front part thereof according to some embodiments wherein the housing 101,102,103, e.g. the cover top 101, is insulated from the heating arrangement 111, 112, 113, 114, 115. The housing 101, 102, 103 being insulated from the heating arrangement 111, 112, 113, 114, 115 may be referred to as a cover insulating position. As will be described in more detailed below, when the heating arrangement 111, 112, 113, 114, 115 has been supplying heat for some time and a local temperature above a local threshold temperature has been reached at the transition area between the cover top 101 and the heating arrangement 111, 112, 113, 114, 115, the cover top 101 will be insulated from the heating arrangement 111, 112, 113, 114, 115 in order not to supply more heat to the cover top 101. Thereby, the heating arrangement 111, 112, 113, 114, 115 will only heat the camera window 104, 111. Thus, all available heater power may be used for defrosting the camera window, such that a clear view may more quickly be obtained.

The monitoring camera 100 comprises a thermally conductive member 201 having a first contacting surface 201-1 and a second contacting surface 202-2. The first contacting surface 201-1 is arranged in contact with the housing 101, 102, 103, e.g. the cover top 101, of the monitoring camera 100 and the second contacting surface 201-1 is arranged in contact with a contacting surface 115-1 of the heating arrangement 111, 112, 113, 114, 115 when a local temperature at the thermally conductive member 201 is below a local temperature threshold, thereby arranged to transfer heat supplied by the heating arrangement 111, 112, 113, 114, 115 to the housing 101, 102, 103, e.g. the cover top 101.

Further, the monitoring camera 100 comprises a thermally insulating member 202 having a first contacting surface 202-1 arranged in close proximity with the housing 101, 102, 103, e.g. the cover top 101, and a second contacting surface 202-2 arranged in close proximity with the contacting surface 115-1 of the heating arrangement 111, 112, 113, 114, 115.

At least one out of the thermally conductive member 201 and the thermally insulating member 202 is configured to, when the local temperature at the thermally conductive member 201 and the thermally insulating member 202 increases above the local temperature threshold during operation of the heater 112, change its extension in a direction perpendicular to the contacting surface 115-1 of the heating arrangement 111, 112, 113, 114, 115 to:

enable contact between the first contacting surface 202-1 of the thermally insulating member 202 and the housing 101, 102, 103, e.g. the cover top 101, and between the second contacting surface 202-2 of the thermally insulating member 202 and the contacting surface 115-1 of the heating arrangement 111, 112, 113, 114, 115, and disable contact between the first contacting surface 201-1 of the thermally conductive member 201 and the cover top 101, and between the second contacting surface 201-2 of the thermally conductive member 201 and the contacting surface 115-1 of the heating arrangement 111, 112, 113, 114, 115, thereby arranged to thermally insulate the housing 101, 102, 103, e.g. the cover top 101, from the heating arrangement 111, 112, 113, 114, 115.

Thanks to the arrangement of the thermally conductive member 201 and the thermally insulating member 202, wherein the thermally conductive member 201 is in thermal contact with the housing 101, 102, 103, e.g. the cover top 101, and the heater 112 when the local temperature at the thermally conductive member 201 and the thermally insulating member 202 is below the local temperature threshold, the heater 112 is able to heat the camera window 104,111 in combination with the housing 101, 102, 103 as long as the local temperature at the thermally conductive member 201 and the thermally insulating member 202 is below the local temperature threshold. This means that as long as the housing 101, 102, 103, e.g. the cover top 101 is heated, heat will also be transferred from the cover top 101 to other parts of the housing 101, 102, 103 and to other components, e.g. electrical components, arranged in thermal contact with the housing 101, 102, 103. This is especially advantageous in very cold environments, wherein one or more electronic components, such as a central processing unit (CPU), need to be heated to a temperature above an operation temperature threshold in order to be able to be switched on. However, when the local temperature at the thermally conductive member 201 and the thermally insulating member 202 has reached the local temperature threshold, no heating of electronical components is needed and the thermally insulating member 202 will be in contact with the housing 101, 102, 103, e.g. the cover top 101, and the heater 112, thereby thermally insulating the housing 101, 102, 103 from the heater 112.

For example, in a low temperature environment, such as at an ambient temperature of −40 degrees Celsius, some electrical components, e.g. the CPU, will have a temperature that is below their operation temperature threshold, e.g. below −30 degrees Celsius, and will therefore not be capable of being switched on. Therefore, in order to be able to start the electronical components, e.g. the CPU, it is necessary to start the heater 112 to heat the CPU until it reaches a temperature above the operation temperature threshold. Thus, when the heater 112 is switched on at −40 degrees Celsius or below, the heater 112 will in addition to heating the camera window 104,111 also heat the electronical components, e.g. the CPU, via energy transfer from the housing 101, 102, 103 to the CPU. The heater 112 will continue to heat the housing 101, 102, 103 and thus the CPU until the local temperature at the thermally conductive member 201 and the thermally insulating member 202 is above the local temperature threshold, e.g. above 20 degrees Celsius. When the local temperature at the thermally conductive member 201 and the thermally insulating member 202 reaches the local temperature threshold, e.g. 20 degrees Celsius, one of the thermally conductive member 201 and the thermally insulating member 202 changes its extension such that thermally insulating member 202 is in contact with the housing 101, 102, 103, e.g. the cover top 101, instead of the thermally conductive member 201, whereby the housing 101, 102, 103 will be thermally insulated from the heater 112 and the heater 112 will only heat the camera window 104, 111 as long as it is switched on.

Figure 4:
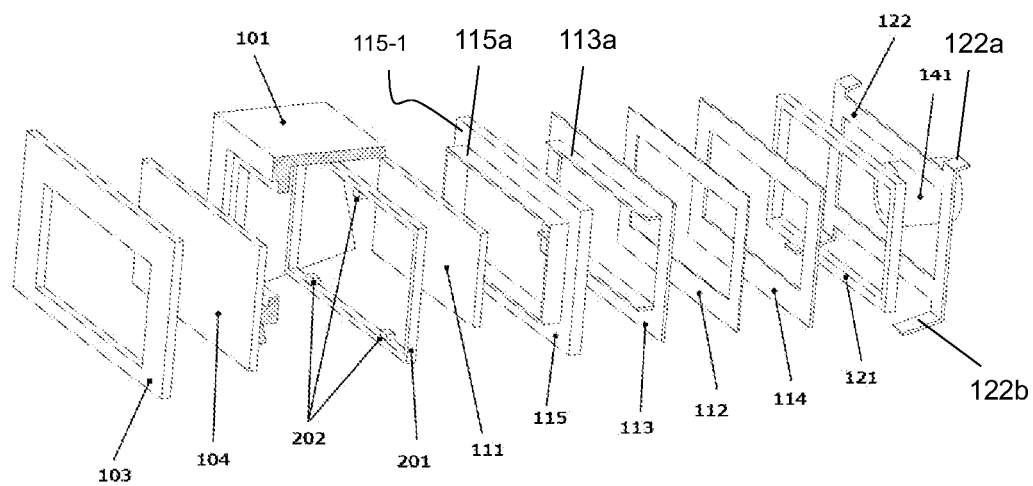
FIG. 4 is an exploded perspective view of some of the components of the front part of the monitoring camera according to some embodiments.

FIG. 4 is an exploded perspective view of some of the components of the front part of the monitoring camera 100 according to some embodiments.

By the expression "front part of the monitoring camera 100" when used in this disclosure should be understood a part of the monitoring camera 100 facing a scene monitored by the monitoring camera 100 and being closer to the scene as compared to a back part of the monitoring camera 100.

The monitoring camera 100 has the heating arrangement 111,112,113,114,115 comprising the heater 112. In one or more embodiments, the heating arrangement 111,112,113, 114,115 may comprise a thermally conductive holder 115 configured to hold the heater 112 between an outer heater holding plate 113 and an inner heater holding plate 114 and configured to hold the heater 112 in thermal contact with the camera window 104, 111 to supply heat to peripheral parts thereof during operation of the heater 112.

Further, the heating arrangement 111,112,113,114,115 may comprise one or more out of the inner window 111, the outer heater holding plate 113, the inner heater holding plate 114 and the holder 115. Thus, even if the embodiment depicted in the figure shows the inner window 111, the heater 112, the outer heater holding plate 113, the inner heater holding plate 114 and the holder 115, it should be understood that the heating arrangement may comprise only the heater 112. The heater 112 may be a single heater within the entire monitoring camera 100. Alternatively, the heater 112 may be one out of a plurality of heaters comprised in the monitoring camera 100, but the heater 112 is the only one heater, i.e. a single heater, arranged to heat the outer window 104 alone and the outer window 104 in combination with heating the housing 101, 102, 103. As will be described in more detail below, by heating the housing 101, 102, 103, heat will also be conducted to one or more electronical components, such as a central processing unit, comprised in the monitoring camera 100 and thereby the one or more electronical components will be also be heated. Heating of the electronic components may be crucial at very low ambient temperatures when the temperature at the electronic components is below their operation threshold temperature.

The heater 112 may be configured as a hollow frame. Thus, the heater 112 may be a plate, sheet or a disc having a hollow shape. As previously described, by the expression "hollow frame" when used in this disclosure is meant that heater 112 is made as a plate, sheet or disc having an inner opening and an outer circumferential part surrounding the inner opening. As also previously mentioned, the outer circumferential part is sometimes referred to as the edging.

The heater 112 is configured to be mounted within the monitoring camera 100 such that its edging, or at least a part of its edging, surrounds peripheral parts of the camera window 104,111. For example, the heater 112 may be mounted such that inner parts of its edging surround central parts of the camera window 104,111 and such that outer parts of its edging overlap peripheral parts of the camera window 104,111.

In some embodiments, the edging of the heater 112 overlaps with peripheral parts of the outer window 104 and surrounds peripheral parts of the inner window 111. For example, the edging or part thereof may overlap with an outer edge of the outer window 104, while surrounding an outer edge of the inner window 111. This is schematically illustrated in FIGS. 2 and 3.

The outer heater holding plate 113 and the inner heater holding plate 114 may be configured as hollow frames and may be made of aluminum. In some embodiments, the heater 112 is held between the inner heater holding plate 114 and the outer heater holding plate 113. In some embodiments, the holder heater 115 is configured to hold, e.g. to integrally hold, the inner window 111, the heater 112, the outer heater holding plate 113, and the inner heater holding plate 114. In some embodiments, the outer heater holding plate 113 comprises an inner flange or rim 113a configured to hold or be attached to the inner window 111. The inner flange or rim 113a is angled relatively the plane of the outer heater holding plate 113. For example, the angle between the inner rim or flange 113a and the outer heater holding plate 113 may be approximately 90 degrees. Further, the inner flange or rim 113a may extend along the inner circumference of the outer heater holding plate 113 or along a part the inner circumference of the outer heater holding plate 113.

The holder 115 may be made of a plastic material having a high thermal conductivity, e.g. a thermal conductivity being higher than a thermally insulating material. Thereby, the holder 115 is capable of conducting heat supplied by the heater 112. The holder 115 may be configured as a hollow frame having an inner flange or rim 115a configured to hold or be attached to the inner window 111. The inner flange or rim 115a is angled relatively the plane of the holder 115. For example, the angle between the inner rim or flange 115a and the holder 115 may be approximately 90 degrees. Further, the inner flange or rim 115a may extend along the inner circumference of the holder 115 or along a part the inner circumference of the holder heater 115.

Further, the monitoring camera 100 comprises an elastic member 121 and a fixation plate 122. According to embodiments, the elastic member 121 is biased and arranged between the inner heater holding plate 114 and the fixation plate 122, which fixation plate 122 is fixedly arranged to an inner surface of the housing 101, 102, 103, e.g. an inner surface of the cover top 101. The fixation plate 122 may comprise a first part 122a configured to be attached to an upper part of the housing 101, 102, 103, e.g. to the cover top 101 or to an upper part of the cover front 103. Further, the fixation plate 122 may comprise a second part 122b configured to be attached to a bottom part of the housing 101, 102, 103, e.g. to the cover bottom 102 or to a bottom part of the front cover 103. The first and second parts 122a, 122b of the fixation plate 122 may be configured as flanges or rims extending at an angle out from the plane of the fixation plate 122. The biased elastic member 121 is configured to urge the heater 112 towards the camera windows 104,111 by pressing the inner heater holding plate 114 towards the camera windows 104,111.

The monitoring camera 100 further comprises a conventional imaging assembly comprising known components. The image assembly functions in a normal way and will therefore not be described in any detail in this disclosure. The imaging assembly comprises a lens 141 associated with an image sensor 142. Images of a scene outside the camera windows 104,111 will be captured by the imaging assembly and transmitted, via a wire or wirelessly (not shown), to a printed circuit board (PCB) 151 and to a central processing unit (CPU) 152 mounted on the PCB 151. The PCB 151 is thermally connected to the cover top 101. In some embodiments, the PCB 151 is thermally connected to the housing 101, 102, 103, e.g. to the cover top 101 via the cover bottom 102.

The monitoring camera 100 may further comprise a thermal conductive member 153 arranged on the cover bottom 102 and configured to connect the PCB 151 with the cover bottom 102. Further, the CPU 152 may be configured to be heated when the housing 101, 102, 103, e.g. the cover top 101, is thermally connected to and heated by the heater 112.

For example, when the housing 101, 102, 103 is heated and when thus also the cover bottom 102 is heated, the thermal conductive member 153 will conduct heat from the cover bottom 102 to the PCB 151. Thus, the thermal conductive member 153 is configured to thermally connect the PCB 151 with the cover bottom 102. The thermal conductive member 153 may be configured as a sheet.

In some embodiments, the CPU 152 may be capable of being switched on for operation when its temperature is above a lower CPU operation threshold temperature. The lower CPU operation threshold temperature may be in the range of −40 to −20 degrees Celsius. For example, the lower CPU operation threshold temperature may be −30 degrees Celsius. In such embodiments, the CPU 152 needs to be heated to a temperature above the CPU operation temperature threshold before it is capable of being switched on for operation.

The CPU 152 has an operation temperature range from e.g. minus 30 degrees Celsius to plus 80 degrees Celsius. Thus, outside this operation temperature range, the CPU 152 will not be functioning, or it will be functioning suboptimally. If the CPU 152 is not able to operate or if the CPU 152 operates poorly, the monitoring camera 100 will not be able to operate satisfactorily. Therefore, at very cold temperatures, e.g. below minus 30 degrees Celsius, the CPU 152 needs to be heated so its temperature is above a CPU operation temperature threshold. If the CPU operation temperature range is as exemplified above, the CPU operation temperature threshold may be set to minus 30 degrees Celsius.

In some embodiments, the camera window 104, 111 is a compound window comprising the inner window 111 configured as a transparent plate arranged closest to a camera lens, and the outer window 104 configured as a protective window and arranged in a plane parallel to the inner window 111, on an outside thereof, and in close proximity with the inner window 111.

Alternatively, and in some embodiments, the heating arrangement 111, 112, 113, 114, 115 comprises the inner window 111 configured as a transparent plate. In such embodiments, the camera window 104, 111 is the outer window 104 configured as a protective window and arranged in a plane parallel to the inner window 111, on an outside thereof, and in close proximity with the inner window 111.

The inner window 111 may be made of a transparent material, such as glass. The outer window 104 may be made of a transparent material, such as polycarbonate.

Since the outer window 104 and the inner window 111 are arranged in close proximity to each other across the entire window plane, and since glass has a higher thermal conductivity than polycarbonate, heat supplied to the inner window 111 will be transferred to the outer window 104. When the outer window 104 is heated, possible ice and snow adhered to the outer window 104 will melt and the monitoring camera 100 is able to capture an image of a scene without any adhered ice and snow blocking the field of view of the monitoring camera 100.

FIGS. 5-10 are schematic plan views of the thermally conductive member 201 and the thermally insulating member 202 according to some embodiments. The thermal conductivity of the thermal conductive member 201 is higher than the thermal conductivity of the heat insulating member 202.

Figure 5:
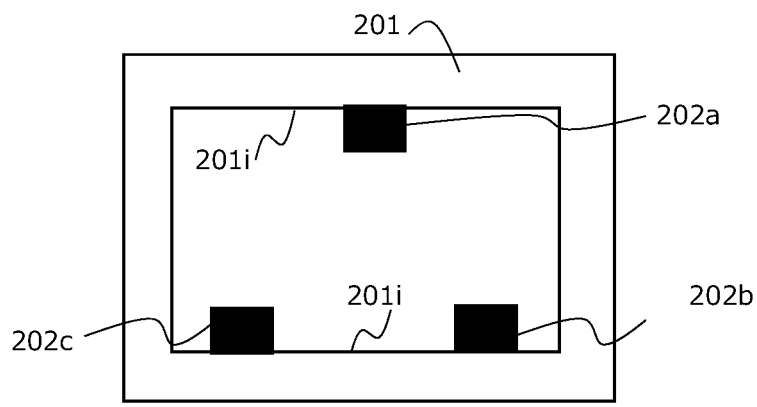
FIGS. 5-10 are schematic plan views of the thermally conductive member and the thermally insulating member according to some embodiments.
Figure 6:
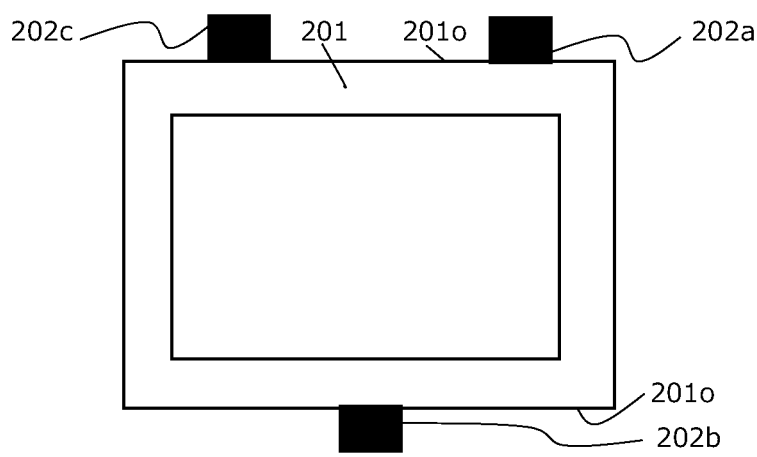
Figure 7:
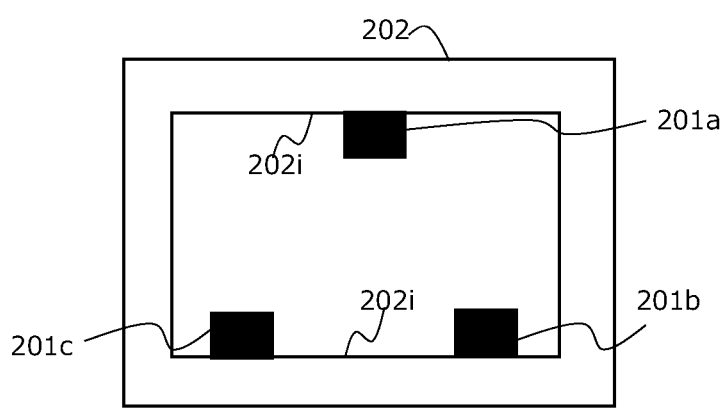
Figure 8:
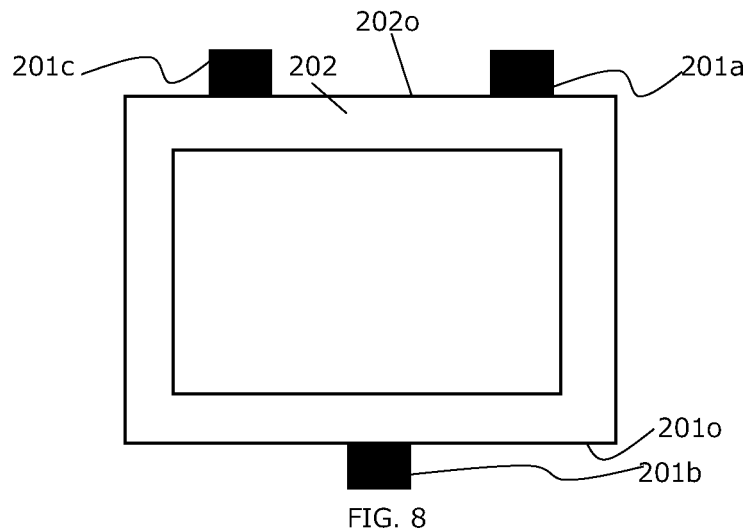

In some embodiments, cf. FIGS. 5 and 6, the thermally conductive member 201 is a hollow frame, and the thermally insulating member is configured as one or more thermally insulating elements 202a, 202b, 202c, attached to one or more inner surfaces 201-i and/or to one or more outer surfaces 201-o of the hollow thermally conductive member 201.

As previously mentioned, by the expression "hollow frame" when used in the disclosure should be understood as a plate, sheet or disc having an outer circumferential part surrounding an inner opening. The outer circumferential part is sometimes referred to as an edging. Thus, the hollow frame may comprise an edging surrounding the inner opening. The inner opening may be a central opening. The hollow frame may have a rectangular, circular or oval shape, as may the inner opening.

Alternatively, and in some embodiments, the thermally insulating member 202 is a hollow frame, and the thermally conductive member 201 is configured as one or more thermally conducting elements 201a, 201,b, 201c, attached to one or more inner surfaces 202-i and/or to one or more outer surfaces 202-o of the hollow thermally insulating member 202. Such embodiments are exemplified in FIGS. 7 and 8.

Figure 9:
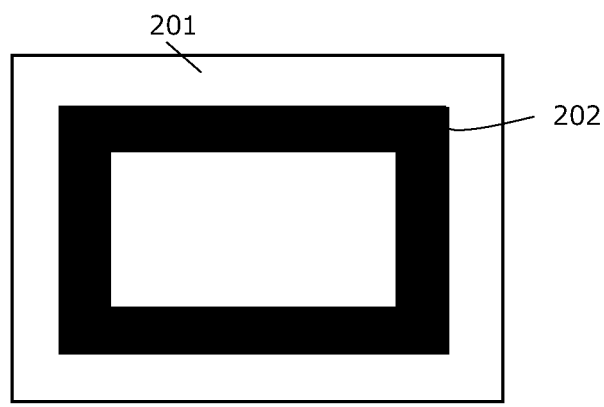
Figure 10:
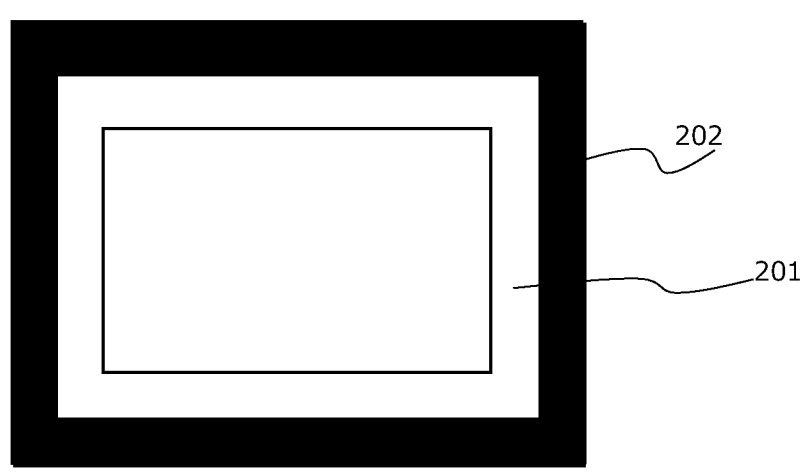

In some embodiments disclosed herein, one of the thermally conductive members 201 and the thermally insulating member 202 is an outer hollow frame and the other one of the thermally conductive members 201 and the thermally insulating member 202 is an inner hollow frame attached within the outer hollow frame. FIG. 9 schematically illustrates embodiments wherein the thermally conductive member 201 is an outer hollow frame and the thermally insulating member 202 is an inner hollow frame, and FIG. 10 schematically illustrates embodiments wherein the thermally insulating member 202 is an outer hollow frame and the thermally conductive member 201 is an inner hollow frame.

A thickness of the thermally conductive member 201 may be the same or almost the same as a thickness of the thermally insulating member 202 at the local threshold temperature. The thicknesses may be taken in the direction perpendicular to the contacting surface 115-1 of the heating arrangement 111, 112, 113, 114, 115.

In some embodiments, the local threshold temperature is in the range of 10 to 30 degrees Celsius. For example, the local threshold temperature may be 20 degrees Celsius.

The thermally conductive member 201 may be made from aluminum. Further, the thermally insulating member 202 may be made from plastic.

By a suitable choice of materials for the thermally conductive member and the thermally insulating member, it may be ensured that they have thermal expansion coefficients such that the relative change in extension mentioned above is obtained. In the example described above, the thermally conductive member is made of aluminum, whereas the thermally insulating member is made of plastic. As will be appreciated by the skilled person, other materials may also be used. With knowledge of the thermal expansion coefficients of the materials chosen for the thermally conductive member and the thermally insulating member, the dimensions of the respective parts can be calculated such that it is ensured that at low temperatures, e.g., below a local temperature threshold of 20 degrees Celsius, the thermally conductive member establishes contact between the heater and the housing. It can also be ensured that at higher temperature, above the local temperature threshold, the thermally insulating member expands more than the thermally conductive member, thus disabling contact between the heater and the housing. In this manner, the heating arrangement becomes self-regulating in that heating of the housing will cease automatically when the local threshold temperature has been reached. Heating of the window may then continue until all snow or ice thereon has been melted. This defrosting may continue as long as the ambient temperature is below 0 degrees Celsius, or until a local temperature of the window has been raised far enough above a window temperature threshold to ensure that ice and snow will not build up for some time. Alternatively, or additionally, image analysis of images captured by the camera may be used for determining if there is ice on the window. When the view through the window is blocked to a predetermined degree, the heater may be switched on, regardless of the ambient temperature, and when the view is once more clear, the heater may be switched off. Image analysis may also provide a way of finding dew on the outside or the inside of window. The heater may in such case be switched on for removing the dew, even though the ambient temperature and the local window temperature are not low enough for ice formation. Again, when the image analysis determines that the view is clear, the heater may be switched off. In the case of dew formation, the local temperature at the thermally conductive member and the thermally insulating member may in many instances already be above the local temperature threshold, such that no energy need be wasted on heating the housing. In other instances, the local temperature will quite quickly rise above the local temperature threshold, thereby ensuring that heating of the housing soon ceases, and all heater power is made available for dew removal on the window.

It should be understood that although a local temperature threshold of 20 degrees Celsius has been mentioned in the example above, depending on the placement of the electronical components in need of heating, the operation temperature of those electronical components, and the heat conducting properties of the housing, the local threshold temperature may be different.

The invention claimed is:

1. A monitoring camera having a heating arrangement for supplying heat to a camera window, the monitoring camera comprising:
a thermally conductive member having a first contacting surface and a second contacting surface, the first contacting surface being in contact with a housing of the camera and the second contacting surface being in contact with a contacting surface of the heating arrangement when a local temperature at the thermally conductive member is below a local temperature threshold, thereby arranged to transfer heat supplied by the heating arrangement to the housing;
a thermally insulating member having a first contacting surface arranged in close proximity with the housing and a second contacting surface arranged in close proximity with the contacting surface of the heating arrangement, and
wherein at least one of the thermally conductive member and the thermally insulating member is configured to, when the local temperature at the thermally conductive member and the thermally insulating member increases above the local temperature threshold during operation of the heater, change its extension in a direction perpendicular to the contacting surface of the heating arrangement to:
enable contact between the first contacting surface of the thermally insulating member and the housing and between the second contacting surface of the thermally insulating member and the contacting surface of the heating arrangement, and
disable contact between the first contacting surface of the thermally conductive member and the housing and between the second contacting surface of the thermally conductive member and the contacting surface of the heating arrangement, thereby arranged to thermally insulate the housing from the heating arrangement.

2. The monitoring camera of claim 1, wherein the thermally conductive member is a hollow frame, and wherein the thermally insulating member is configured as one or more thermally insulating elements attached to one or more inner surfaces and/or to one or more outer surfaces of the hollow thermally conductive member.

3. The monitoring camera of claim 1, wherein the thermally insulating member is a hollow frame, and wherein the thermally conductive member is configured as one or more thermally conducting elements attached to one or more inner surfaces and/or to one or more outer surfaces of the hollow thermally insulating member.

4. The monitoring camera of claim 1, wherein one of the thermally conductive member and the thermally insulating member is an outer hollow frame and the other one of the thermally conductive member and the thermally insulating member is an inner hollow frame attached within the outer hollow frame.

5. The monitoring camera of claim 1, wherein a thickness of the thermally conductive member is the same or almost the same as a thickness of the thermally insulating member at the local threshold temperature, and wherein the thicknesses are taken in the direction perpendicular to the contacting surface of the heating arrangement.

6. The monitoring camera of claim 1, wherein the local threshold temperature is in the range of 10 to 30 degrees Celsius.

7. The monitoring camera of claim 1, wherein the thermally conductive member is made from aluminum.

8. The monitoring camera of claim 1, wherein the thermally insulating member is made from plastic.

9. The monitoring camera of claim 1, wherein the heating arrangement comprises:
a thermally conductive holder configured to hold the heater between an outer heater holding plate and an inner heater holding plate and configured to hold the heater in thermal contact with the camera window to supply heat to peripheral parts thereof during operation of the heater.

10. The monitoring camera of claim 9, further comprising a biased elastic member arranged between the inner heater holding plate and a fixation plate fixedly arranged to an inner surface of the housing, and wherein the biased elastic member is configured to urge the heater towards the camera window by pressing the inner heater holding plate towards the camera window.

11. The monitoring camera of claim 1, further comprising:
a central processing unit, CPU, arranged on a printed circuit board, PCB, thermally connected to the housing, and wherein the CPU is configured to be heated when the housing is thermally connected to and heated by the heater.

12. The monitoring camera of claim 11, wherein the CPU is capable of being switched on for operation when its temperature is above a lower CPU operation threshold temperature, and wherein the lower CPU operation threshold temperature is in the range of −40 to −20 degrees Celsius.

13. The monitoring camera of claim 1, wherein the camera window is a compound window comprising:
an inner window configured as a transparent plate arranged closest to a camera lens; and
an outer window configured as a protective window and arranged in a plane parallel to the inner window, on an outside thereof, and in close proximity with the inner window.

14. The monitoring camera of claim 13, wherein the inner window is made of a transparent material such as glass, and the outer window is made of a transparent material such as polycarbonate.

15. The monitoring camera of claim 1, wherein the heating arrangement comprises an inner window configured as a transparent plate; and wherein the camera window is an outer window configured as a protective window and arranged in a plane parallel to the inner window, on an outside thereof, and in close proximity with the inner window.

* * * * *